United States Patent
Dauvergne

[11] 3,878,680
[45] Apr. 22, 1975

[54] HEAT INJECTION ENGINE APPARATUS
[76] Inventor: Hector A. Dauvergne, 550 Superior Ave., San Leandro, Calif. 94577
[22] Filed: Nov. 23, 1973
[21] Appl. No.: 418,751

Related U.S. Application Data
[63] Continuation-in-part of Ser. No. 76,908, Sept. 30, 1970, Pat. No. 3,774,390.

[52] U.S. Cl. .................. 60/511; 60/649; 60/674; 92/100
[51] Int. Cl. ............................... F01k 21/04
[58] Field of Search .......... 92/99; 60/508, 509, 512, 60/514, 511, 515, 649, 674

[56] References Cited
UNITED STATES PATENTS

| | | | |
|---|---|---|---|
| 1,016,210 | 1/1912 | Christie | 60/39 |
| 1,219,970 | 3/1917 | Lowenstein | 60/39 |
| 1,809,409 | 6/1931 | Granger | 60/39 X |
| 2,067,453 | 1/1937 | Lee | 60/521 X |
| 2,185,784 | 1/1940 | Corydon | 92/99 |
| 2,950,739 | 8/1960 | Lofink | 92/99 X |
| 3,227,093 | 1/1966 | Taplin | 92/99 X |

Primary Examiner—Martin P. Schwadron
Assistant Examiner—Allen M. Ostrager
Attorney, Agent, or Firm—Robert R. Tipton

[57] ABSTRACT
The invention concerns heat engine apparatus of the static pressure type in which expansion of a charge of high-temperature, high-pressure fluid energizes the power stroke of a reciprocable plunger. The engine apparatus includes a flash boiler operative to produce energizing steam, an engine mechanism that utilizes the steam to convert the heat energy thereof into mechanical energy, a reservoir into which expanded steam and water vapor are returned and from which water is delivered to the boiler, and controls over which both the temperature of the boiler and quantity of water delivered thereto can be regulatively adjusted. In one form of the apparatus, the engine mechanism includes a chamber subdivided into compressor and engine compartments by a diaphragm reciprocable between alternate extreme positions respectively defining maximum volume for the compressor compartment and minimum volume for the engine compartment, and vice versa. The diaphragm is connected with a reciprocable plunger coupled by crank mechanism to a power shaft which is driven by the plunger on the power stroke thereof in response to expansion of a charge of compressed air heated by a charge of steam injected thereinto while confined within the engine compartment. As a part of the operational cycle, the engine compartment is scavenged by cool air directed thereinto, thereby enabling the engine mechanism to function in part as a condenser in addition to a heat engine.

8 Claims, 8 Drawing Figures

HEAT INJECTION ENGINE APPARATUS

RELATED APPLICATION

This application is a continuation-in-part of my copending patent application, Ser. No. 76,908, filed Sep. 30, 1970, now U.S. Pat. No. 3,774,390, and the entire substance of such prior application is intended to be incorporated herein by this specific reference thereto.

DISCLOSURE

This invention relates to an expansible fluid heat engine apparatus and, more particularly, to static pressure steam engine apparatus. The apparatus is useful in a great number of environments in which internal combustion engines are now used, and specific instances in which the apparatus is especially useful, in addition to the automotive field, are small tools such as lawn mowers, children's toys such as small boats and land vehicles, and similar environments in which it is desirable to have an inexpensive engine with low maintenance requirements.

Objects, among others, of the present invention are in provision of a relatively inexpensive heat engine apparatus of the expansible fluid type that functions as a static pressure engine so that the heat energy contained in the expansible fluid is converted into mechanical energy by the expansion of the fluid rather than as a consequence of any kinetic energy resulting from flow thereof; a structurally simple engine having low maintenance requirements and which can be repaired, when necessary, easily with simple tools and with little knowledge of engines being required; an improved engine of the character described that can burn various types of fuel including gasoline, liquid petroleum gas, alcohol, vegetable oil, etc.; an engine apparatus that may be relatively small to produce a given output horsepower because the volumetric displacement of the engine mechanism is large; an engine mechanism that utilizes steam and air as the expansible fluid with a small volume of superheated steam at relatively high temperature and pressure being injected into a larger volume of compressed air to heat the same and comprise therewith the expansible fluid; and an engine mechanism that serves not only as the converter of heat energy into mechanical energy but also functions as the condenser by means of which expanded steam is cooled prior to its being purged from the engine preparatory to a subsequent cycle of operation.

Additional objects and advantages of the invention, especially as concerns particular features and characteristics thereof, will become apparent as the specification continues.

In one form of engine apparatus embodying the present invention, the engine mechanism is divisible into separable sections respectively constituting a compressor and an engine. In general terms, the mechanism has a compressor section provided with an inlet through which atmospheric air is drawn thereinto, and with an outlet through which compressed air is accelerated into the engine section of the mechanism. Such engine section is provided with an energizing-fluid inlet through which charges of high-temperature, high-pressure steam are injected into the engine compartment to mix with and heat charges of compressed air therein to produce a composite fluid effective to energize the power stroke of the engine. The engine section is further provided with a compressed-air through which relatively cool compressed air from the compressor section is admitted into the engine compartment to cool the expanded steam therein and to purge the engine compartment. The engine section also includes an outlet through which the expanded steam and air expelled following the power stroke of the engine mechanism. A common diaphragm separates the two sections and is reciprocable between position extremes respectively corresponding to minimum volume for the compression section and maximum volume for the engine section, and vice versa. The diaphragm is connected with a reciprocable plunger coupled by crank mechanism to a rotatable power shaft, and the plunger imparts torque thereto in response to expansion of each fluid charge within the engine section.

As explained in my aforementioned copending patent application, one of the fundamental concepts utilized in this particular embodiment of the invention derives from the realization that a very large volumetric displacement can be effected with a very small linear movement if the volume displaced has the geometric configuration of a cone, or frustum of a cone, and if the displacement is effected by a large area diaphragm fixed at its perimetric edge and reciprocable elsewhere between maximum and minimum volume extremes. Although the usual cylindrical piston having the same area as the base of such diaphragm define a greater volumetric displacement for the same axial reciprocation, such a large piston-and-cylinder combination is impracticable because of the requisite ring size and the consequent very high frictional losses owing to the slidable engagement of such rings with the circumjacent walls of the cylinder. The large volumetric displacement and manner in which the volume changes with diaphragm displacements results in a pulse-type energization of the power stroke upon injection of each stream charge which, in a sense, is used as the vehicle for transmitting heat to a charge of compressed air within the engine compartment at the instant of stream injection.

Embodiments of the invention are illustrated in the accompanying drawings, in which.

Figure 1:
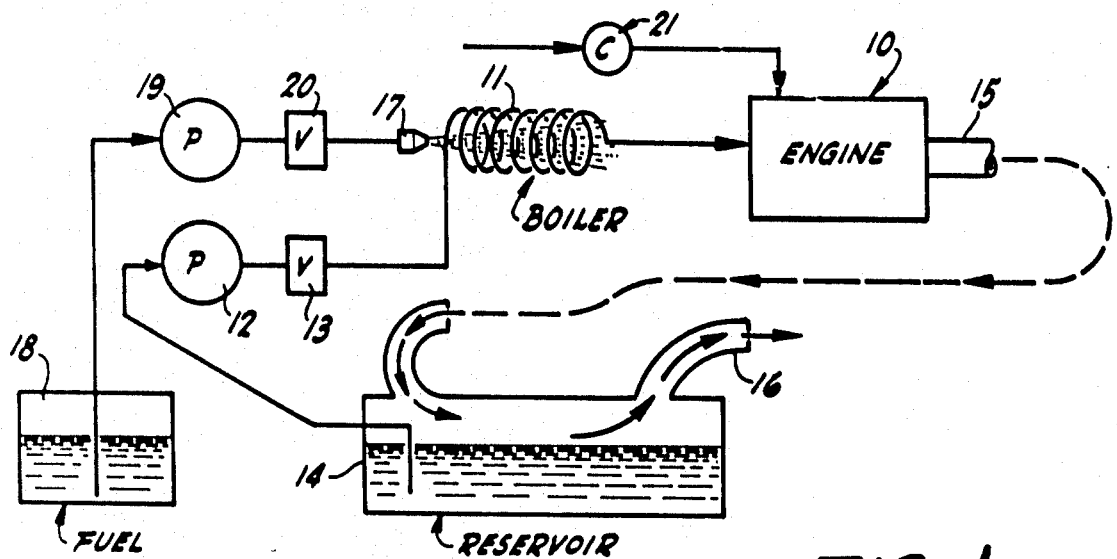
FIG. 1 is a diagrammatic view illustrating the functional association of the components of the steam engine apparatus embodying the present invention.

Steam engine apparatus embodying the present invention is generally depicted in FIG. 1, and it includes a steam engine 10 connected with a boiler 11 to receive high-pressure steam therefrom and convert the same into mechanical energy. A boiler feed pump 12 is connected with the boiler 11 via a control system 13, which may take the form of a valve mechanism, to deliver water under pressure to the boiler from a reservoir 14. Exhaust fluids from the engine 10 are returned to the reservoir 14 through an exhaust conduit 15, and the reservoir communicates with atompshere through a conduit 16 through which spent fluids are exhausted to atmosphere. The boiler 11 is heated by a burner 17 that receives fuel from a tank 18 through a pump 19 and control system 20 connected therebetween, the latter of which may be in the form of valve mechanism.

The pumps 12, 19 are control systems 13, 20 may be conventional mechanisms operative to deliver water and fuel, respectively, to the boiler 11 and nozzle 17. The control systems 13 and 20 enable the volumetric flows to the boiler and nozzle to be controlled and regulatively varied in accordance with the contemporary demands of the engine component 10. The reservoir 14 may include or be connected with a condenser which will comprise a component in a typical closed system and is generally preferred to improve engine efficiency, but in any case it is vented to atmosphere to enable gaseous fluids such as air entrained in the expanded steam returned to the reservior from the engine to escape to atmosphere. The fuel tank 18 is completely conventional, and any fuel may be used to supply heat to the boiler 11 depending upon the particular type of boiler incorporated in the mechanism and the character of the nozzle 17. In this respect, a typical hydrocarbon fuel such as gasoline, kerosene, fuel oil, etc., may be used and the boiler may be a typical and standard flash-type boiler. Also shown in FIG. 1 in association with the engine 10 is a compressor 21 effective to provide a supply of relatively cool fluid for injection into the engine at certain predetermined intervals in a cycle of operation thereof. Such supply of fluid may be atmospheric air, and it enables the engine to function in part as a condenser, all as explained in detail hereinafter.

In operation of the engine apparatus illustrated in FIG. 1, the boiler 11 is heated to the requisite temperature by the nozzle 17 through control of the quantity of fuel delivered to the nozzle through the pump 19. The quantity of water delivered to the boiler 11 from the reservior 14 by the pump 12 is also regulatively adjusted by the control system 13, thereby providing the system with adjustment over both the temperature of the boiler and the supply of water thereto. High-pressure steam leaving the boiler 11 is directed into the engine 10 through control valve means (not indicated in FIG. 1), and the steam is used within the engine to energize the power stroke thereof. Following such power stroke, a supply of compressed air is directed into the engine by the compressor 21 through valve means (not indicated in FIG. 1), and at the same time, valve means (not indicated in FIG. 1) opens the exhaust conduit 15 to enable both expanded steam and air to be returned to the reservior 14 from which the air and some steam escapes to atmosphere via the conduit 16. This operational procedure is continued for as long as the engine apparatus remains in operation.

Figure 2:
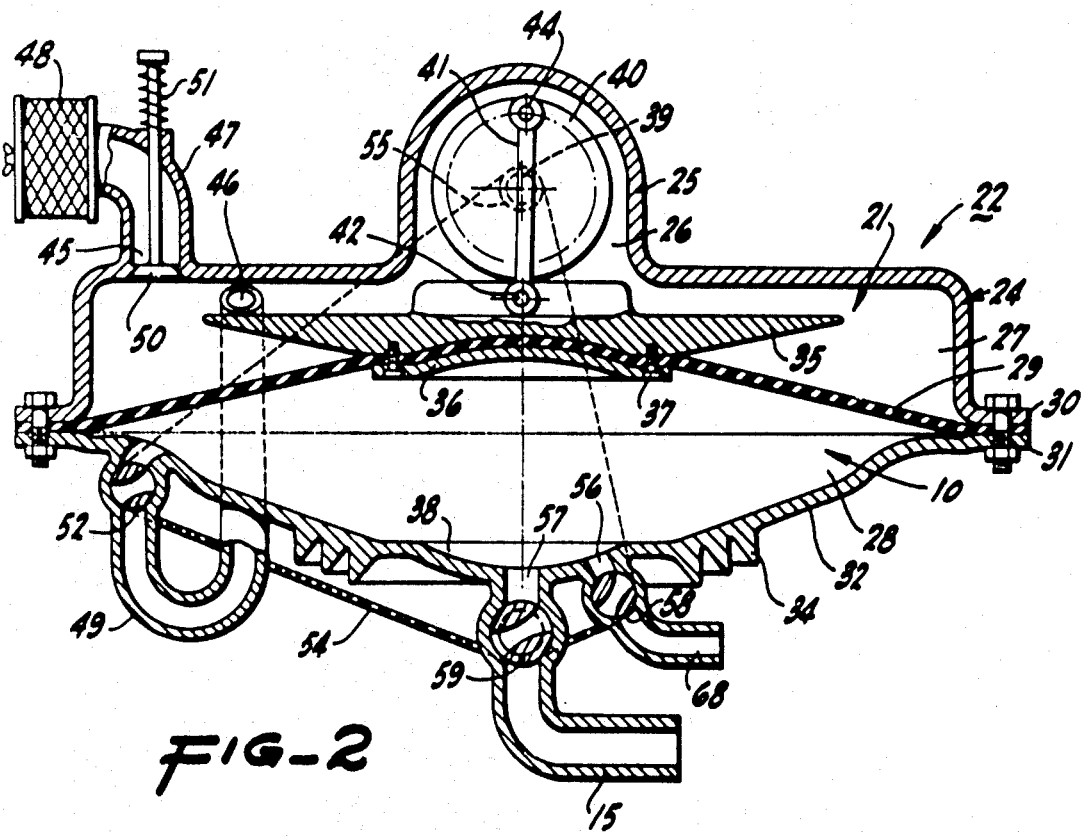
FIG. 2 is an axial section view through the engine component of the apparatus depicted in FIG. 1.

FIG. 2 illustrates mechanism embodying the present invention, and such mechanism in its entirety is denoted with the numeral 22. The mechanism 22 includes the aforementioned engine 10 and compressor 21, the latter of which is a low-presser compressor or blower. These two functional subdivisions of the mechanism 22 have common components, as will be explained in detail hereinafter, but for purposes of general reference and convenience of discussion, the compressor and engine sections of the mechanism 22 are separately denoted and may be discussed independently in the subsequent description.

The mechanism 22 includes casing structure 24 that, is a conventional manner, may be formed by bolting together or otherwise interconnecting a plurality of separate casing components. In this respect, the casing structure 24 includes a crankcase 25 defining the usual chamber or space 26 in which are mounted crank mechanism, gearing, etc. The casing structure 24 enlarges beyond the lateral dimensions of the crankcase 25 and defines a large chamber subdivided into a compressor compartment 27 and an engine compartment 28 by a diaphragm 29 mounted within the chamber intermediate the ends thereof and extending completely thereacross. In the form shown, the casing structure 24 is turned outwardly to form a perimetric flange 30, and bolted thereto is a mating perimetric flange 31 of a casing head 32 which may be equipped externally with cooling fins 34 to dissipate heat that may develop within the compartment 28. In the specific embodiment of the invention being considered, the diaphragm 29 is a flexible component having a perimetric edge portion confined between the mating flanges 30 and 31, thereby hermetically separating or subdividing the total chamber into the aforementioned compartments 27 and 28.

The diaphragm 29 is displaceable between maximum and minimum position extremes respectively corresponding to states of maximum and minimum volumes with reference to each of the compartments 27 and 28. Such position extremes are respectively shown in FIGS. 3 and 4 (the position shown in FIG. 3 being slightly beyond and displaced from the extreme position assertedly represented thereby), and since the compartments 27 and 28 are reversely or oppositely oriented, it will be appreciated that one extreme position of the diaphragm 29 will essentially represent maximum volume for the compartment 27 and minimum volume for the compartment 28, and vice versa whenever the diaphragm 29 is in its opposite extreme position.

Centrally, the diaphragm 29 is equipped along one side thereof with a platform or diaphragm driver 35, and on the opposite side of the diaphragm in generally facing relation with the platform 35 is a reaction head or shield 36 fixedly secured to the platform by a plurality of cap screws 37. The diaphragm 29 is sandwiched between the platform 35 and reaction head 36, and is fixedly related to each by the cap screws which pass therethrough. The reaction head 36 and, therefore, the diaphragm 29 and platform 35 may be dish-shaped or concave, as illustrated in FIG. 2, to cooperate with a correspondingly concave or dish-shaped concavity 38 in the casing head 32 when the diaphragm 29 is in the extreme position thereof illustrated in FIG. 4. The resultant space including the concavity 38 is substantially closed and thereby provides a receiving space into which energizing fluid is expressed, as explained in detail hereinafter.

Opertively associated with the platform 35 is a power shaft 39 journalled in the casing structure 24 for free rotation relative thereto. The power shaft 39 may take the usual form of a crankshaft having an offset throw connected with the platform by means of the usual connecting rod and wrist pin arrangement, or it may take the form illustrated in FIG. 2 in which the platform 35 is connected to the shaft 39 by crank means constituting a large disk 40 keyed or otherwise secured to the shaft 39 so as to rotate therewith and a link or rod 41 pivotally connected to the platform 35 at 42 and to the disk 40 at 44. It will be evident that such interconnection of the platform 35 and power shaft interrelates the linear displacements of the plunger 29 and platform 35 with the angular motion described by rotation of the power shaft 39. Thus, during the power stroke of the diaphragm 29 and platform 35, the power shaft 39 will have angular motion positively imparted thereto.

The chamber formed by the compartments 27 and 28 is provided with a valve-equipped inlet and with a valve-equipped outlet and in more particular terms, each of the compartments 27 and 28 is provided with both an inlet and an outlet, and each of the inlets and outlets is controlled by a valve associated therewith. Considering first the compression compartment 27, the inlet and outlet ports thereof are respectively denoted with the numerals 45 and 46. An inlet conduit 47 essentially forming a part of the casing structure 24 is in open communication with the inlet port 45 and is provided with an air filter 48 affording ingress of atmospheric air which is carried by the conduit 47 to the inlet for movement therethrough into the compartment 27. Analagously, an outlet conduit 49 for compressed gases is in open communication with the outlet port 46 and receives the pressurized gaseous discharge therefrom.

The inlet port 45 is equipped with a valve 50, which, in the form shown, is a pressure-responsive valve that serves as a check valve permitting air to flow inwardly through the port 45 into the compartment 27 but preventing reverse flow of air. Accordingly, whenever the diaphragm 29 is displaced downwardly toward the position shown in FIG. 4 to enlarge the compartment 27, the pressure within the compartment tends to decrease whereupon the valve 50 opens to permit air to flow inwardly into the compartment to maintain the pressure therein. The valve 50 is biased toward the closed position thereof by a relatively weak compression spring 51 the force of which is readily overcome by pressure differentials across the inlet 45 when the diaphragm 29 is displaced in a direction away from the inlet port, as explained.

The outlet port 46, and more particularly the conduit 49 in communication therewith, is equipped with a valve 52 that takes the form of a rotary valve disposed adjacent the end of the conduit 49 communicating with the compartment 28. The valve 52 is adapted to be cyclically opened and continuously driven, and it is cyclically opened and closed by means of a drive train that includes an endless chain 54 entrained about a drive gear or sprocket 55 mounted upon the drive shaft 39 and keyed thereto so as to rotate therewith. The chain 54 is similarly entrained about a sprocket (not shown) operatively associated with a rotary valve 52. It will be apparent that the valve 52 is open during each 180° rotation thereof, whereupon the valve is effective to establish communication between the conduit 49 and the compartment 28 twice during each 360° rotation of the valve. In the particular mechanism 22 being considered, the valve 52 rotates the one-half the velocity of the drive shaft 39, thereby being opened once during each complete reciprocatory displacement of the diaphragm 29.

The engine compartment 28 is also provided with an energizing-fluid inlet port 56 and with an outlet port 57 through which expanded energizing fluid is removed from the compartment. The inlet and outlet 56 and 57 are respectively equipped with rotary valves 58 and 59 having drive sprockets (not shown) about which the chain 54 is entrained so as to continuously drive the valves 58 and 59 in synchronism with the valve 52 and at substantially the same angular velocity. The valves 58 and 59 are, accordingly, open once during each complete reciprocatory displacement of the diaphragm 29. The valve-equipped inlet 56 for energizing fluid is adapted to be connected with the boiler 11 through a flow conduit 60, and the valve-equipped outlet 57 is adapted to be connected with the reservoir 14 through the aforementioned flow conduit 15. The drive shaft 39, it will be understood, is adapted to be connected with a utilization device which, in the case of a lawn mower or similar vehicle may be through a simple transmission or mechanism for selectively disconnecting the drive shaft therefrom for purposes of starting the engine apparatus and for controlling such vehicle.

A complete cycle of operation of the engine apparatus 10 will now be described with particular reference being made to FIGS. 3 through 5 which respectively illustrate successive stages in said complete cycle of operation. As hereinbefore indicated, the particular engine mechanism 22 being considered effects one complete operational cycle for each 360° rotation of the shaft 39 and complete cyclic reciprocation of the plunger 35 thereby making the engine mechanism a two-cycle mechanism. However, the engine mechanism is susceptible of both two-cycle and four-cycle operation in accordance with the particular valving and timing used, and a multiple stage mechanism can be provided, all as is well known.

Figure 3:
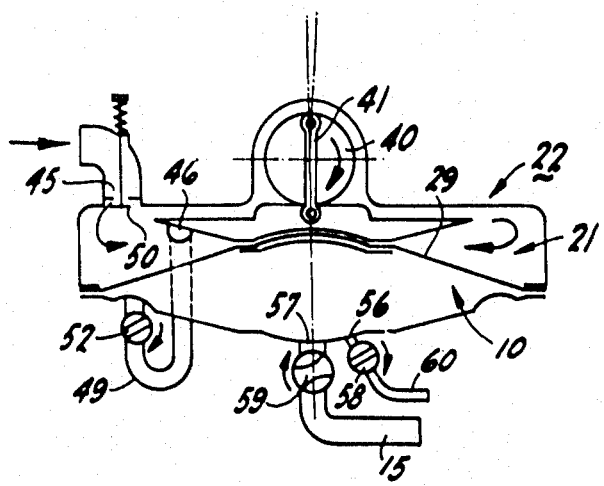
FIGS. 3 through 5 are diagrammatic views, generally corresponding to the sectional illustration of the engine shown in FIG. 2, depicting various functional intervals in a cycle of operation of the engine component.

Considering the mechanism 22 to have the condition illustrated in FIG. 3 as the starting condition, the diaphragm 29 is approximately in one of its extreme positions in which the compressor 21 is at minimum volume and the engine 10 is at maximum volume. The rotary valves 52 and 58 are closed, the rotary valve 59 has just closed, and the inlet valve 50 into the compressor 21 is opening because of the commencing downward displacement of the diaphragm 29. The power shaft and crank disk 40 thereon are rotating in a clockwise direction, and as actually shown in FIG. 3, the shaft and disk are displaced from their zero-displacement or starting position by approximately 2°. This condition of the valves is essentially maintained as the shaft and disk 40 are displaced through approximately 180° into the position shown in FIG. 4 in which the diaphragm 29 is in substantial abutment with the casing wall of the engine compartment.

Figure 4:
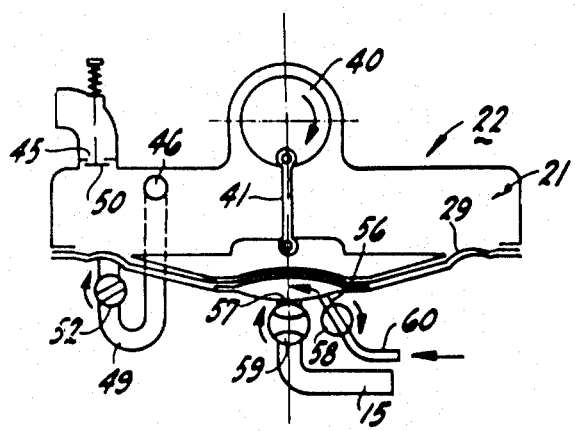

As the diaphragm 29 moves from the extreme position thereof shown in FIG. 3 into the opposite extreme position illustrated in FIG. 4, the progressively diminishing volume in the engine compartment caused by the moving diaphragm compressed the fluid (essentially air) within the engine compartment to some predetermined value such as, for example, of the order of 60 psig. This quantity of compressed air will be confined within the small curvilinear compression space into which the inlet and outlet ports 56 and 57 communicate (see FIG. 4). At the same time, the progressively increasing volume in the compressor compartment causes the decrease in pressure therein with the result that the inlet valve 50 opens to enable atomspheric air to enter the compressor compartment through the inlet port 45. At the approximate 180° position of the crank disk 40 shown in FIG. 4, the inlet valve 50 will close.

thereby trapping the charge of atmospheric air within the compressor compartment.

At this time, the valve 58 controlling ingress of hot energizing fluid into the engine compartment is open, thereby permitting a charge of energizing fluid to enter the engine compartment through the inlet opening 56. As previously explained, the energizing fluid is advantageously high-temperature and high-pressure steam, and as a small volume thereof is injected into the engine compartment, it rapidly mixes with the charge of compressed air therein to heat such charge, whereupon the composite fluid mass expands to energize the power stroke of the plunger or platform 35. The expanding energizing fluid causes the diaphragm 29 to be displaced toward the alternate extreme position thereof illustrated in FIG. 3, and during a substantial part of such displacement of the diaphragm, all of the valves 52, 58, and 59 remain closed. The valve 58 closes quickly after a small predetermined charge of energizing steam has been admitted into the engine compartment, the closed position being illustrated in FIG. 5 which depicts the 315° position of the crank disk 40. During such displacement of the diaphragm 29, the inlet valve 50 also remains closed, thereby compressing the charge of atmospheric air confined within the pressurizing compartment of the compressor 21.

Figure 5:
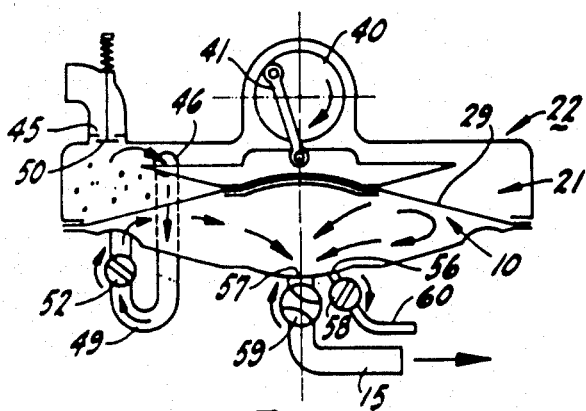

As the diaphragm 29 approaches the position shown in FIG. 5, the valve 52 begins to open, thereby enabling compressed air within the compressor compartment to be expressed outwardly therefrom via the port 46 and conduit 49 into the compartment of the engine 10. The incoming compressed air is relatively cool because the pressure thereof is relatively low so that no significant heat of compression is developed therein, and also because the compression of the air is somewhat isothermal in character in that the large surface area of the casing structure surrounding the compressor 21 enables any heat of compression to dissipate quite rapidly. Thus, the admission of relatively cool compressed air into the compartment of the engine 10 causes an admixture of the air with the expanded partially cooled steam and air to further cool the same, thereby causing the enging 10 to serve also as a condenser for the overall steam engine apparatus. It should be observed that the compressed air entering the engine compartment after passing through the valve 52 does not enter through a single port but rather through a plurality of ports disposed about the entire periphery of the engine compartment and communicating therewith from a distribution manifold. Accordingly, a thorough and rapid admixture of the incoming air and expanded fluid occurs. This condition obtains until the crank disk 40 reaches the 180° position thereof approximated in FIG. 3, at which time the maximum charge of air has been expressed by the diaphragm 29 from the compressor 21 into the engine 10. Also, the valve 52 has been rotated into the closed position thereof shown in FIG. 3.

Referring again to FIG. 5, it will be noted that the exhaust valve 59 is commencing to open at approximately the same time that the air-control valve 52 opens, thereby enabling the fluid mass (i.e., an admixture of steam, hot air, and cool air) within the compartment of the engine 10 to commence its escape into the exhaust conduit 15. As the diaphragm 29 continues to be displaced upwardly into the extreme position thereof shown in FIG. 3, the valves 52 and 59 continue to open and remain so until the diaphragm 29 is displaced into the position shown in FIG. 3. Thus, as the diaphragm moves from the 315° position shown in FIG. 5 into the 360° position shown in FIG. 3, the gaseous fluids within the engine compartment are exhausted therefrom in preparing the compartment for another cycle of operation. Thus, a complete cycle of operation has been completed in which a charge of energizing steam is expressed into the engine compartment via the valve 58 and port 56 to mix with the heat a charge of compressed air then in the compartment, and the admixture promptly expands against the diaphragm 29 to energize the power stroke of the crank 40 and drive shaft associated therewith. The spent steam and air body is then chilled by admixture within the engine compartment with relatively cool atmospheric air from the compressor 21, and the fluids then within the engine compartment (which include hot and cool air, steam, and water vapor) are exhausted therefrom via the port 57, valve 59, and exhaust conduit 15 which returns the same to the reservoir 14.

The frequency of operating speed of the engine mechanism 22 is determined by the volumetric delevery of water to the boiler 11 and/or by the temperature of the boiler which, in turn, is determined by the volumetric supply of fuel to the burner 17. As previously explained, the control system 13 and 20 therefor may be in the form of relatively simple valves, and suitable means for adjusting the same are readily provided to enable one operating the engine system to adjust and tailor the same regulatively in accordance with variations in contemporary load requirements. Although the engine mechanism itself functions as a condenser, the system depicted in FIG. 1 is nevertheless open via the vent 16 to atmosphere, and some loss of water vapor will occur through the vent conduit 16 along with the atmospheric air passing through the reservoir via the conduits 15 and 16. Make-up water can be added to the reservior 14 as required to compensate for any such water losses in the system.

The mechanism 22 has very low friction since sealing rings and other high-friction sealing devices are not required. Further, the reciprocable stroke of the platform 35 (often referred to for convenience as the "plunger" either individually or in combination with the diaphragm 29) is quite short with the result that there is a low internal friction or mechanical hysteresis in the diaphragm as it is displaced between the extreme alternate positions respectively illustrated in FIGS. 3 and 4. Nevertheless, because of the double frusto-conical configuration through which the diaphragm 29 moves, it has a large displacement even though the stroke thereof is quite short, whereby the operating velocity of the mechanism can be high and the fatique of the diaphragm nevertheless very low.

By way of further indicating the characteristics of the mechanism 10, in the specific embodiment thereof being considered, substantially all of the parts are made of aluminum. The diaphragm 29 is generally rectangular having an axial length of approximately sixteen inches and a transverse width of approximately fourteen inches. The convex reaction head 36 may have a diameter of the order of 5 inches, the velocity of the shaft 39 may approximate 4,000 RPM, and the entire stroke length of the line or crank arm 41 may be about two inches (one inch from center). The peak pressure developed in the compartment 27 of the compressor 21 may be as much as 15 to 18 psig although positive pressures of but a few psig are adequate to purge or scavenge the engine compartment 28 in the manner previously explained. The temperature of the steam available at the energizing inlet 56 may ary considerably within the limits tolerated by the diaphragm 29 and materials from which the mechanism is fabricated. Within these parameters, higher temperatures are preferred because of the greater quantity of available heat contained therein. It has been found that superheated steam in very small quantities at temperatures and pressures of the orders of 800° F and 200 psig produce useful results, and are well within the working temperatures of ordinary silicone rubber materials from which the diaphragm 29 may be fabricated, and which working temperatures are of the order of 500° F.

In this reference, the average temperature within the engine compartment 28 are very much lower than the instantaneous or peak temperatures represented by the super-heated steam charges and well below the 500° F working temperature of a silicone-rubber diaphragm. Actually, the peak temperature is reduced at an extremely rapid rate because of the enormous increase in volume within the engine compartment as the diaphragm moves from the FIG. 4 to the FIG. 3 position on the power stroke. Further, the steam and compressed air charge heated thereby reacts initially against the reaction head 36 which serves to shield the diaphragm; and the diaphragm is continuously cooled on one side by atomspheric air within the compartment 27 and by the same atmospheric air expressed into the engine compartment via the conduit 49. Moreover, the energizing charge of steam is small relative to the volume of compressed air into which it is injected, say of the ratio of one-to-three, and a charge of about one-third of a cubic inch at the 800° F and 200 psig temperature and pressure noted will be effective to energize a compressed air change of about one cubic inch a temperature approximating 300° F and a pressure of about 60 psig. A steam supply rate of about 0.157 pounds per minute in the engine example given with the temperature and pressure parameters stated will produce output shaft power of the order of 1.5 horsepower at a shaft velocity of 4,000 RPM with an overall engine efficiency of 18 percent, whereupon the last waste will bew equivalent to about 7.0 horsepower.

The variable-volume compartments 27 and 28 define in part by the reciprocable diaphragm 29 represents large volumetric displacements because of the double-cone-shaped inversion of the diaphragm in being moved between the opposite extreme positions thereof, and such large volume displacements are effective with a very short stroke to produce a useful output. The low mechanical friction permits a much more efficient utilization of the fuel energy available at the nozzle 17, thereby permitting use of a smaller mechanism in any situation iwthout a corresponding reduction in the output energy delivered thereby.

Respecting volumetric displacement and using the dimensions set forth in the foregoing example, a diaphragm 29 having a length and width of sixteen inches and eighteen inches, respectively, and a total displacement of 2 inches - i.e., one inch in each direction from the center - will have a displacement of about one-hundred and 50 cubic inches ($V=16 \times 14 \times 1/3 \times 2$). A standard cylindrical piston-and-cylinder combination with the same stroke length would have a diameter of about 10 inches ($D=2 \sqrt{150/2pi}$) which is totally impracticable size in the usual case.

Figure 6:
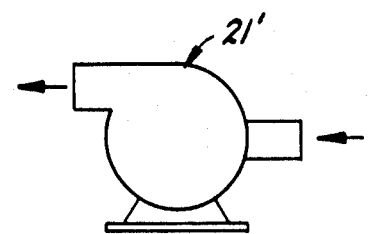
FIG. 6 is a diagrammatic view of a centrifugal blower which may be used to develop an air stream for use in a modified engine apparatus.
Figure 7:
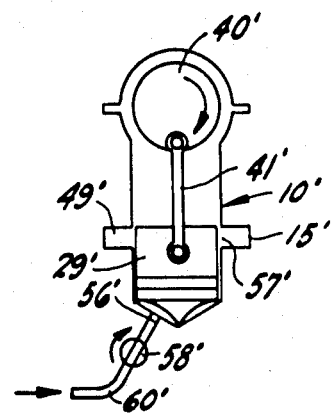
FIGS. 7 and 8 are axial sectional views, largely diagrammatic, of a modified engine component illustrating different phases in a cycle of operation thereof.
Figure 8:
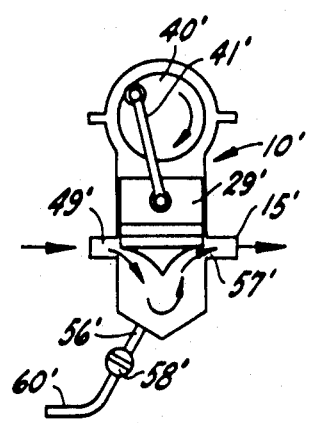

The general principles heretofore described with reference to a complete cycle of operation of the steam engine apparatus are applicable to piston-cylinder engine mechanism, as illustrated in FIG. 7 and 8 or the drawings. Similarly, a source of compressed air suitable for purging the engine compartment may be derived from a centrifugal, lobe, or other compressor apparatus as an alternative to that forming a part of the mechanism 22. In FIG. 6 a conventional centrifugal blower 21' is illustrated which can be connected with the conduit 49 to provide the cool atmospheric air for admission into the engine compartment to chill the expanded steam therewithin. Analuguosly, the compressor 21' may be used to supply condensing and purging air to the engine mechanism 10' shown in FIGS. 7 and 8. Since the general function of the variant mechanisms shown in FIGS. 6 through 8 respectively correspond to those heretofore described with respect to the mechanism 22, the same numerals are used to identify respectively corresponding elements and parts in the embodiments of the invention shown in FIGS. 6 through 8 except that each numeral is primed for purposes of differentiating the same from those previously used in association with the mechanism 22.

The engine 10' includes a casing defining a cylinder within which a piston 29' is reciprocable. The piston is coupled to the crank disk 40' by a connecting rod 41', whereupon the piston is reciprocated between the extreme positions thereof generally shown in FIGS. 7 and 8 as the crank disk 40' rotates. The engine compartment or cylinder space within which the piston 29' is reciprocable is provided with an inlet 49' for compressed air, with an exhaust outlet 57' connected with the return conduit 15', and with an energizing-fluid inlet 56' connected to a supply line 60' via a control valve 58'. In the position of the piston 29' shown in FIG. 7, the valve 58' is open so that steam is ejected through the inlet 56' for admixture with a quantity of compressed air within the cylinder space whereupon the fluid body expands against the piston 29' to displace the same through its power stroke. After a predetermined charge of steam has been expressed through the inlet 56', the valve 58' is closed, as previously explained.

As the steam and air body expands within the cylinder space and against the piston 29', it displaces the latter into the position shown in FIG. 8 in which the inlet 59' and outlet 57' are opened because the piston has moved therepast, thereby enabling the inflow of compressed air to mix with the expanded steam and air to cool the same, and to then purge or scavenge the cylinder space by outward movement of the mass through the discharge port 57'. The inlet 49' and discharge outlet 57' remain open as the piston continues to be displaced through its power stroke (upwardly as viewed in FIGS. 7 and 8) and through a portion of its return stroke until the piston again covers the two openings. The fluid (essentially air) trapped within the cylinder space is compressed by continuted movement of the piston 29' into the piston thereof shown in FIG. 7, and such compressed air body has the steam charge injected thereinto through the energizing-fluid inlet 56'.

It will be apparent that the piston-cylinder mechanism illustrated in FIGS. 7 and 8 does not have the same volumetric displacement for practicable sizes as the mechanism 22 heretofore described, and it may have higher-friction values developed depending upon the sealing relationship of the piston 29' with the circumjacent cylinder walls. A limited time interval is characteristically available for scavenging the cylinder space since the piston 29 functions also as the control valve for the inlet and outlet 49' and 57'. Although a source of compressed air for accomplishing such scavenging of the cylinder space may be supplied by the centrifugal blower 21', in many instances a source of compressed air able to deliver higher-pressure values to the inlet 49' may be advantageous. As previously explained, however, the principles described are susceptible of four-cycle operation which will obviate the time-interval and any other disadvantage of the two-cycle engine 10' shown in FIGS. 7 and 8. In this general reference, it may be observed that the engine mechanism 22 heretofore described in a two-cycle engine mechanism but it is readily converted into four-cycle operation should this be desired.

In all forms of the invention, the advantages of external combustion at the nozzle 17 are gained, and the dual control over the steam supply and boiler temperature permits relatively fine regulation and adjustment of the output of the engine apparatus. Further, the entire apparatus and engine mechanism 22 are relatively simple, requiring no complicated carburetion devices, cooling systems, lubrication techniques, etc. Thus, the engine apparatus can be produced inexpensively and fulfills the requirements for many applications in which high-efficiency and great power are not requisites, although it is applicable to high-power, improved-efficiency environments. In all embodiments of the invention, the apparatus serves both as a heat engine in which the heat energy available in a small charge of steam or other fluid is injected into a quantity of compressed gas whereupon the heat and pressure energy of the composite fluid mass is converted into mechanical energy, and as the means for condensing the expanded or spent steam after it has energized the power stroke of the engine's mechanism. Thus, the overall engine apparatus is further simplified by the plurality of functions performed by the engine mechanism.

In the cycle of operation described with reference to FIGS. 3 through 5, the various rotary valves 52, 58, and 59 each travel through an angular distance of approximately 22.5° while the crank disk 40 rotates through an arcuate distance approximating 45°. However, each rotary valve is open for only 11.25° as it travels through the angular distance of 22.5°. Thus, each port associated with the respective rotary valves will have an angular extent of about 11.25°. Nevertheless, each port and opening through the associated rotary valve will be sufficiently large to accommodate the volume of fluid that is to flow therethrough in a given time interval, and this is readily accomplished by making each valve, opening therethrough, and associated port as long as is necessary to provide the flow volume desired (i.e., the length is in a direction normal to the plane of the drawing illustrating FIGS. 3 through 5).

As previously indicated, a pulsating-type energization of the reciprocable displacements of the diaphragm 29 is effected upon injection of each charge of steam into the compressed air charge trapped between the reaction head 36 of the plunger and facing surface of the casing structure 24, as the apparatus is illustrated in FIG. 4. This result is achieved in part owing to the flexibility of the diaphragm, the enormous change in volume that occurs with relatively linear displacement of the reaction head 36 toward the position thereof shown in FIG. 3, and because of the relatively small volume of the compressed-air and the steam charge referenced to the rapidly enlarging volume in the engine compartment 28 as the diaphragm is displaced toward the maximum-volume position thereof. This pulsation-type energization, however, is effective to energize the power stroke of the plunger and diaphragm assembly because of the very low frictional inhibition to movement thereof throughout a major portion of its displacement and because the resistive compression within the compressor compartment 27 does not build significantly until the plunger tends to reach its maximum displacement. It should be appreciated that the shaft 39 will be provided with a relatively heavy flywheel therealong in which momentum is stored, all as is well known, thereby both tempering the pulsating energization as it appears along the shaft 39 and supplying any momentum necessary to carry the plunger and diaphragm assembly through the maximum-resistance displacement thereof which occurs only toward the end of the displacement movement, as explained. It should be observed in this reference that as the plunger and diaphragm assembly move toward the maximum position thereof, the valve 52 is open to enable compressed air within the compressor compartment 21 to be expelled therefrom via the conduit 49 and into the engine compartment 28, thereby establishing a maximum value to the pressure resistance that can be exerted against the plunger and diaphragm assembly as it moves from the 315° position thereof shown in FIG. 5 into the 180° position shown in FIG. 3.

It will be apparent from the foregoing discussion that a method is encompassed by the inventive concepts for energizing the power stroke of engine apparatus having relatively movable components defining a variable-volume space cyclically variable between maximum and minimum volumes. In such method, the steps are present of compressing a quantity of substantially gaseous fluid within the variable-volume space during movement of the components toward the minimum-volume positions thereof. Next, a charge of high-temperature fluid is injected into the compressed fluid to heat the same and thereby invest thermal energy therein. Thereafter, the composite fluid mass is expanded within the space to act and react, respectively, against the components to effect relative movement thereof toward their maximum-voltage positions and the thereby energize the power stroke of the engine apparatus. Finally, the expanded fluids are scavenged from the space prior to a subsequent compression of fluid therein.

The movable components of the engine apparatus may take various forms including the mechanism 22 heretofore described in which one of the components includes the reciprocable diaphragm 29 and the other such component that casing structure 24. Similarly, the apparatus may take the structural asemblage illustrated in FIGS. 7 and 8 in which such components are defined by conventional piston-and-cylinder structures. The apparatus may also take a rotary configuration such as the Wankel engine in which the exact location of the variable-volume space may change as the general triangular rotor is angularly displaced relative to a stationary casing component. Irrespective of the form the engine takes, a variable-volume space in incorporating therein, and it cyclically varies between maximum and minimum volumes. The engine, as previously explained, may be a two-cycle engine or a four-cycle engine or any variant thereof, and it may have one or more stages or sections, as is well known in the engine art. In certain instances, it may be feasible to convert existing internal combustion engines into external combustion engines by providing a means of generating a high-temperature and high-pressure fluid such as steam, and then cyclically injecting the steam or other energizing fluid into each piston-cylinder structure, for example, at the top of the compression stroke thereof through a steam-distribution head. The distribution head will necessarily bear a time relationship to the reciprocable piston and various valves so that energizing fluid is injected at the proper interval into each cylinder structure.

While in the foregoing specification, embodiments of the invention have been set forth in considerable detail for purposes of making a complete disclosure thereof, it will be apparent to those skilled in the art that numerous changes may be made in such details without department for the spirit and principles of the invention.

What is claimed is:

1. A method of energizing the power stroke of a two-cycle engine apparatus having relatively movable components defining a variable-volume spaced cyclically variable between maximum and minimum volumes comprising the steps of compressing a volume of air in said space from said maximum volume to said minimum volume during a first cycle period, injecting a high temperature fluid into said compressed air volume proximate the end of said first cycle period investing energy therein and creating a composite fluid mass, expanding said composite fluid mass within said space imparting movement to said movable components until maximum volume of said space is reached during a second cycle period, and injecting a relatively cool air volume into said space proximate the end of said second cycle period exchanging heat from said composite fluid to said cool air volume to condense and expel condensed liquids from said space leaving a volume of air in said space for compression and repeating of said cycles.

2. The method as claimed in claim 1 wherein said high temperature fluid is superheated steam.

3. The method as claimed in claim 1 wherein the quantity of said high temperature fluid is one-third the quantity of said volume of air.

4. A heat injection engine comprising means defining a casing having means defining a variable volume space, means for cyclically varying said space therein during a first cyclic period between maximum and minimum volume and during a second cyclical period between minimum and maximum volume, a power shaft journalled for rotation relative to said casing and connected to said means for cyclically varying a space to enable the later to drive the former, means defining an air inlet port, an energizing fluid inlet port and an exhausted port adapted to communicate with said casing and said means for cyclically varying said space.

means for opening said air inlet port at the beginning of said first cycle, means for injecting cool compressed air into said variable volume space during a first portion of said first cyclic period at maximum volume of said space, means for closing said air inlet port when said cyclically varying means begins to move to minimum volume, means for injecting a quantity of high temperature fluid in said space proximate the end of said first cycle and the beginning of said second cycle when said space is at a minimum volume, means for opening said exhaust port proximate the end of said cycle and the beginning of said next first cycle concurrently with the opening of said air inlet port and the injection of said cool compressed into said variable volume space, and means for closing said exhaust port after said compressed air is injected into said variable volume space and after spent fluids escape from said variable volume space through said exhaust port.

5. The apparatus as claimed in claim 4 wherein said means defining a variable volume space comprises a generally conical casing portion having an apex a peripheral base portion in which said air inlet port is disposed proximate said peripheral base portion of said cone, said exhaust port and said energizing fluid inlet port are disposed proximate apex of said cone and said means for cyclically varying said space is connected in sealed relation to said peripheral base portion.

6. The apparatus as claimed in claim 5 wherein said means for cyclically varying said space comprises a flexible diaphragm connected in sealed relation said peripheral base portion of said conical casing portion, and a reaction plate connected proximate the center said diaphragm and adapted to reciprocate toward and away from the apex of said conical casing portion, said reactor plate defining a conical section adapted to fit said conical section of said casing portion.

7. The apparatus as claimed in claim 4 further comprising means defining a reaction chamber at minimum volume of said variable volume space with said energizing fluid inlet port and said exhaust port in communication with said reaction chamber.

8. The apparatus as claimed in claim 7 wherein said means defining a variable volume space comprises a generally conical casing portion having an apex a peripheral base portion, with said means for clically varying said space connected in sealed relation to said peripheral base portion, and wherein said reaction chamber comprises a generally concave reaction plate having a peripheral edge connected to said means for cyclically varying space with said peripheral edge adapted to engage said generally conical casing portion proximate said apex to define a reaction chamber thereby

* * * * *